United States Patent [19]

Plog et al.

[11] Patent Number: 5,920,894
[45] Date of Patent: Jul. 6, 1999

[54] CONTROL CIRCUIT FOR GENERATING CONTROL SIGNALS FOR CONTROLLING READ AND WRITE ACCESSES TO A MEMORY

[75] Inventors: Jürgen Plog; Thomas Ernst Friedrich Wille; Ralph Von Vignau, all of Hamburg, Germany

[73] Assignee: U.S. Philips Corporation, New York, N.Y.

[21] Appl. No.: 08/082,326

[22] Filed: Jun. 24, 1993

Related U.S. Application Data

[63] Continuation of application No. 07/554,603, Jul. 18, 1990, abandoned, which is a continuation of application No. 07/369,567, Jun. 21, 1989, abandoned.

[30] Foreign Application Priority Data

Jul. 19, 1989 [DE] Germany ............................ 39 23 872

[51] Int. Cl.$^6$ ..................................................... G06F 12/00
[52] U.S. Cl. ............................................. 711/151; 711/152
[58] Field of Search ..................... 364/200 MS, 900 MS; 395/400 MS, 425 MS; 711/151, 152

[56] References Cited

U.S. PATENT DOCUMENTS

| | | | |
|---|---|---|---|
| 4,527,237 | 7/1985 | Frieder et al. ............................ | 364/200 |
| 4,796,232 | 1/1989 | House ....................................... | 365/189 |
| 4,831,520 | 5/1989 | Rubinfeld et al. ....................... | 395/325 |
| 4,851,991 | 7/1989 | Rubinfeld et al. ....................... | 395/250 |
| 5,050,070 | 9/1991 | Chastain et al. .......................... | 395/375 |
| 5,072,420 | 12/1991 | Conley et al. ............................ | 395/425 |
| 5,091,846 | 2/1992 | Sachs et al. .............................. | 395/250 |

FOREIGN PATENT DOCUMENTS

| | | |
|---|---|---|
| 3502721 | 7/1986 | Germany . |
| 63-183678 | 7/1988 | Japan . |

*Primary Examiner*—David L. Robertson

[57] ABSTRACT

A circuit arrangement for controlling access to a common memory by two or more processors, one of which is privileged, accelerates and simplifies the execution of the accesses by provision for each processor of its own address register and its own data register. As a result, a processor can process the data read during an access while the next access to the memory is already being carried out for another processor. In the case of write operations, the waiting times are reduced, notably for the non-privileged processors when a write operation is interrupted by a privileged processor, because the data to be written can then be transferred directly to the associated data register.

1 Claim, 4 Drawing Sheets

CONTROL CIRCUIT FOR GENERATING CONTROL SIGNALS FOR CONTROLLING READ AND WRITE ACCESSES TO A MEMORY

This is a continuation of application Ser. No. 07/554,603, filed Jul. 18, 1990, abandoned; which is a continuation of application Ser. No. 07/369,567, filed Jun. 21, 1989 also abandoned.

BACKGROUND OF THE INVENTION

1. Field of the Invention

The invention relates to a circuit arrangement for controlling the access to a memory by at least two processors, in which a clock-pulse controlled control circuit that receives request signals from the processors, generates control signals therefrom for access to the memory, and interrupts the execution of an access for a processor when a request signal from the privileged processor appears before termination of said access.

2. Description of the Related Art

A circuit arrangement of this kind is known from DE-OS 35 02 721. Therein, an address register is provided for each processor, but the data terminal of the memory is connected to the corresponding data terminals of the processors, without intermediate buffering, via controlled bus switches. However, many processors require a significant period of time, for example several clock pulse cycles of a clock signal, for delivering and notably for accepting data, and during this time the memory must remain addressed in order to ensure that the data remains valid until the instant of processing or acceptance. Furthermore, when the access by a processor of lower priority is interrupted by the privileged processor, the processor of lower priority must continuously repeat its request until access to the memory has become free. This requires not only a substantial amount of time, but also additional steps as regards the software. The maximum speed of successive accesses, therefore, is not determined by the speed of the memory but by the corresponding speed of the accessing processors.

Memories (Dual Port Memories) for the access of two ports, in particular of two processors, which use data registers are already known. For example, memory arrangements in which the data to be recorded in the memory are temporarily recorded in registers, are described in Japanese Patent Application 63-183678 (English abstract) as well as in IEEE ISSCC Konferenzberichte, February 1985, pp. 44 and 45. Furthermore, a memory control is described in U.S. Pat. No. 4,796,232 in which a data register is provided only for the one processor for the data read from the memory. This patent publication does not describe data registers for both data to be recorded and read data, and the processors or other elements having access to the memory all mutually rank equally and each started access is terminated completely before an access from another port is started.

SUMMARY OF THE INVENTION

Among other things, it is an object of the invention to provide a circuit arrangement of the kind set forth which enables the maximum speed of the memory to be utilized to a large extent for an access, independently of the cycle time of the connected processors.

This object is achieved in accordance with the invention in that for each processor there are provided data registers for the incoming and outgoing data, which data registers are connected between the data terminal of the memory and the data terminal of the relevant processor, and that in response to the appearance of a request signal for the writing of data in the memory the control circuit writes the data supplied by the processor directly into the associated data register and, for the reading of data from the memory, writes the data supplied on the data output of the memory into the associated data register a predetermined period of time after the request signal, provided that no request signal has occurred from the privileged processor during the period of time, and in the event of a request signal from the privileged processor during the execution of the access for another processor, first execute the privileged access and thereupon automatically continues this uncompleted access.

As a result of the use of the data registers for each processor, a high degree of uncoupling is achieved between the memory and the connected processors, so that the speed of successive accesses to the memory is no longer dependent on the speed of the individual processors. This is because the data read from the memory can remain available in the data register for the relevant processor until processed by the processor, and in the mean time further accesses to the memory can already take place. Decoupling is also possible during writing in the memory in a sense that a processor writes the data to be written directly into the data memory, regardless of whether access to the memory is possible at that instant, and can continue its other processing operations, the actual writing of the data into the memory taking place at a later instant. This accelerates not only the operation of the memory in the event of an access by a slow processor, but also the operation of the processors in the case of an access conflict.

In the case of an access to the memory, a multi-bit data word is each time read or written in parallel. The number of bits of a memory word often deviates from the number of bits of a data word for a processor; notably the memory word comprises eight bits, while the processor may utilize 16-bit data words. In this case the data word of a processor is stored at two different, preferably successive addresses of the memory. In order to enable as simply as possible access to the memory by the processor in such a case, in a further embodiment in accordance with the invention for the transmission of words having a p-fold width of the memory word to or from at least one processor, the control circuit successively generates p additional sub-address signals for the memory and addresses successively p memory words in the memory by means of the address signals supplied by the processor, for said processor there being provided p data registers, each of which has a word width of the memory and stores successively p words from the memory when the memory is read and outputs, after acceptance of the last word, all words in parallel on the data terminal for this processor and, for a write operation in the memory, takes up in parallel different parts of the data word to be written into the memory by the processor and outputs these parts successively to the memory. Thus, for the processor the memory appears to have a correspondingly larger data word length, while for the memory merely several successive access operations take place without it being necessary for the memory to be designed for a larger word width. In addition to the speed-wise decoupling between memory and processors, decoupling of the data word width is thus also obtained. In order to adapt the various parts of the wider data word of the processor to the data word width of the memory, in a further embodiment in accordance with the invention the p data registers for each processor are connected in series, thus forming a shift register. A shift register is a means for parallel-series conversion which is also used in other environments.

Digital systems are customarily controlled or synchronized by a clock signal. A system comprising several processors and a common memory can utilize a common clock generator but it is alternatively possible to associate a clock generator with each processor. Notably in the latter case, the control circuit in an embodiment in accordance with the invention effectively consists essentially of two identical parts which receive the same request signals from the processors in parallel, one part being controlled by positive-going clock pulse edges while the other part is controlled by negative-going clock pulse edges, the control signals for the memory and the registers being generated by the part whose associated clock pulse edge occurs first after a request signal from a processor. Thus, each request is processed by the next positive-going or negative-going clock pulse edge, so that the delay in the processing of a request amounts to no more than one half clock period.

It may occasionally occur that the privileged processor accesses the memory to read a memory word which is to be recorded by means of a directly precedingly started access by a non-privileged processor. This write access of the non-privileged processor is now interrupted before the recording has occurred, and the privileged processor would then still read the previous data word. In order to prevent this and to ensure that the privileged processor always receives the really current data, a further embodiment of the invention is characterized in that the control circuit comprises an address comparator which upon a request signal of the privileged processor to read during not yet terminated write access by a non-privileged processor compares the read address with the write address and, in the case of equality, directly transfers the data recorded by the non-privileged processor in the associated data register into the data register of the privileged processor. Herewith it is thus achieved that the privileged processor obtains the new data word although this has not yet been recorded in the memory.

BRIEF DESCRIPTION OF THE DRAWING

Embodiments in accordance with the invention will be described in detail hereinafter with reference to the drawing. Therein

DETAILED DESCRIPTION OF THE PREFERRED EMBODIMENT

Figure 1:
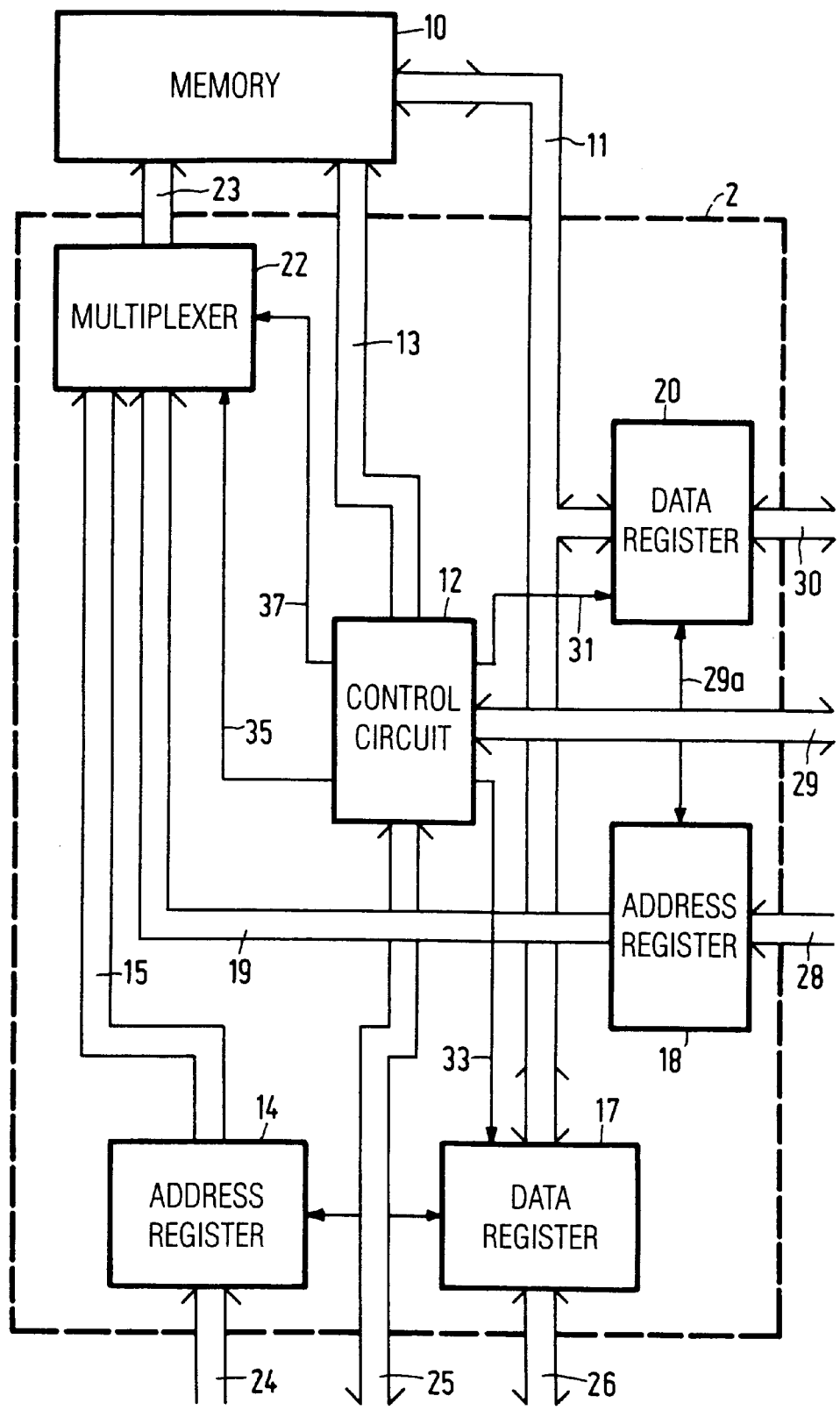
FIG. 1 shows a block diagram of a circuit arrangement in accordance with the invention and its connection to the memory.

In FIG. 1 a memory 10 is coupled, via a circuit arrangement 2, to data, address and control leads of two processors which have been omitted for the sake of simplicity. An address bus 24, a control bus 25 and a data bus 26 lead to one processor, and an address bus 28, a control bus 29 and a data bus 30 lead to the other processor which is in this case the privileged processor. In principle further processors may be connected to the control circuit 2 in a similar fashion. Via the address buses 24, 28, address signals are applied from the processors to the circuit arrangement 2, while data words can be transmitted in both directions via the data buses 26, 30. The control buses 25, 29 comprise conductors leading to the processors as well as control leads extending from the processors to the circuit arrangement 2.

The control leads include a lead for a request signal which at the same time indicates whether the address signals on the relevant address bus are valid; using this request signal, the address signals are thus also written into an address register 14, 18. Moreover, the control signal is applied to a control circuit 12 in which it generates the corresponding control signals or series of control signals on the control bus 13 for the memory 10. The control circuit 12 at the same time controls the priority, i.e. any privileging of the relevant processor. The control circuit 12 also generates further control signals which will be explained hereinafter.

The outputs of the address registers 14, 18 are connected, via the buses 15 and 19, respectively, to a multiplexer 22 which is controlled, via the lead 37, by the control circuit 12 so as to connect one of these buses 15 or 19 to the address lead 23 for the memory 10. However, the address registers 14, 18 may alternatively comprise so-called tri-state outputs which are connected directly to one another and to the address bus 23 of the memory 10 and which are connected so as to be low-ohmic by the control circuit 12 when necessary.

For the data buses 26, 30 of the connected processors there is provided a respective data register 17, 20, it being possible to provide for both transmission directions a respective data register for a complete processor data word or, to switch over the inputs and outputs of a single data register for a processor data word in accordance with the data direction. The data direction is determined by a corresponding signal on the control bus 25, 29, that is to say by the write control signal which indicates whether an access to the memory 10 is to take place for a write operation or for a read operation. In the case of a write operation, the associated data is supplied, via the data bus 26, 30, from the relevant processor, together or before the write control signal and is written into the relevant data register directly by means of this control signal. Furthermore, such a write control signal reaches the control circuit 12 which in response thereto supplies a corresponding control signal, via the control bus 13, to the memory 10 and selects by way of a selection signal via the connection 31, 33, the relevant data register output so as to apply the data contained therein, to the data terminal of the memory 10, via the data bus 11.

In the case of access for a read operation, a defined period of time after the selection and application of an address to the memory 10 via the address bus 23, a data word read and output via the data bus is written into one of the data registers 17, 20 by way of a corresponding control signal on the connection 31 or 33, which data word is then available to the relevant processor on the data bus 26, 30, the relevant other or possibly a further processor then already initiating a new access to the memory 10.

For the described example it is assumed that the processor connected to the buses 28, 29 and 30 processes 16-bit data words, while the memory 10 contains only an 8-bit data word at each memory address. In response to each request from this processor, two addresses of the memory 10 are then directly successively addressed, the data words then read being successively written into the data register 20 and being output in parallel via the data bus 30. In order to control the sequence of the two data words in the memory 10, the address bus 19 is extended by means of a lead 35 for the addresses of this processor, which lead originates from the control circuit 12. This lead 35 initially carries one binary value and as soon as the data word stored at the relevant address in the memory 10 has been read and stored in the data register 20, the signal on the lead 35 is switched over to the other binary value (when this lead represents the least-significant address bit, it controls the neighbouring address in the memory 10), and the data word thus read is also written into the data register 20 by way of a corresponding signal on the lead 31 from the control circuit 12.

Figure 2:
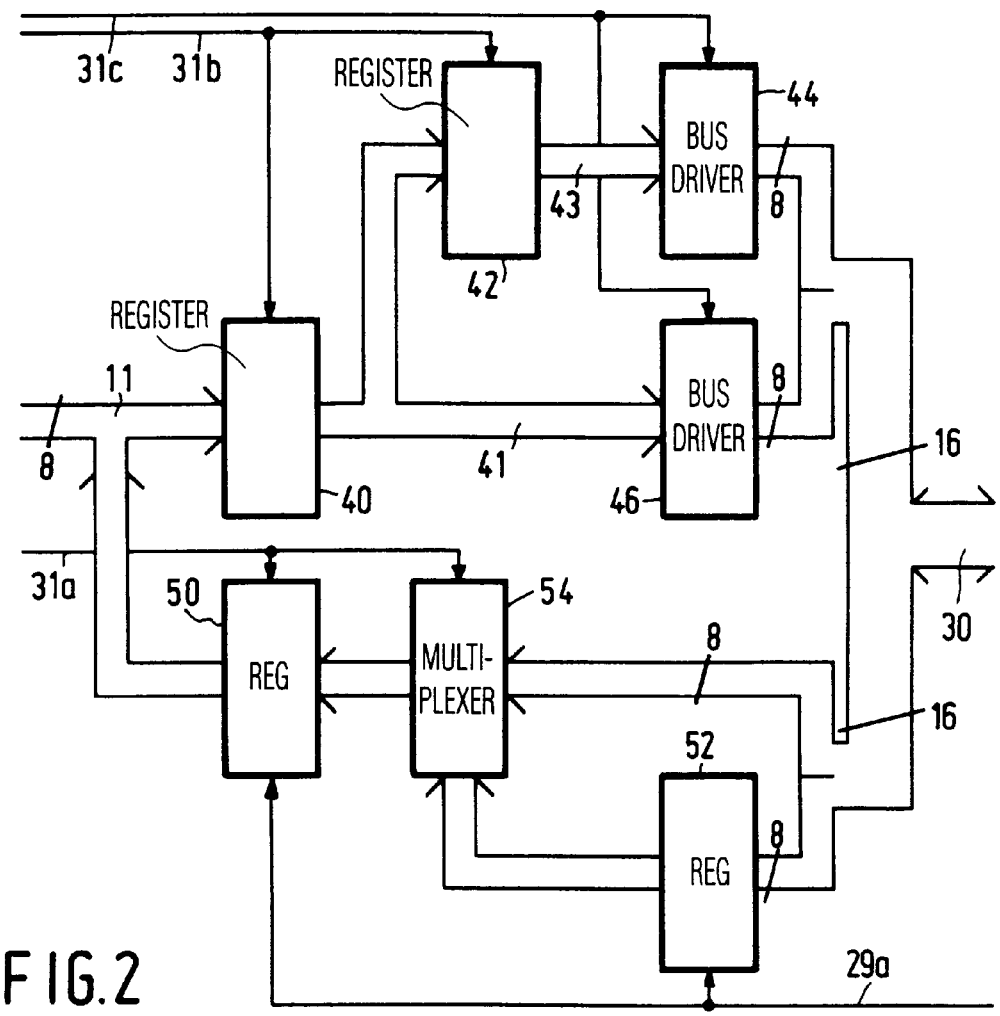
FIG. 2 shows the construction of a data register for the matching of different word widths.

FIG. 2 shows a feasible construction of the data register 20 for such matching of the data word width of the memory to the larger data word width of the associated processor. In FIG. 2 the data bus 11 is connected to the input of a register 40 having the width of a memory data word, being 8 bits in the present case, and the output 41 of the register 40 is connected, via a switched bus driver 46, to the leads for the most-significant data bits of the data bus 30; the output 41 of the register 40 is also connected to the input of a further register 42 which has a width of 8 bits and whose output 43 is connected to the other leads of the data bus via a further switched bus driver 44. The bus drivers 44 and 46 initially are open.

When the first data word is supplied from the memory via the data bus 11, it is written into the register 40 by way of a signal on a lead 31b from the control circuit 12 in FIG. 1. At the same time the previous contents of the register 40 are written into the register 42; however, this is irrelevant in the present context. The second data word supplied via the data bus 11 is also written into the register 40 by way of a corresponding signal on the lead 31b, which register then contains the second data word, the first data word being transferred at the same time to the register 42. Subsequently, the bus drivers 44 and 46 are closed so that the two 8-bit data words can be applied to the processor as a 16-bit data word.

Similarly, for the writing of a 16-bit data word into the memory there are provided two 8-bit registers 50 and 52, the register 50 receiving the corresponding 8-bit part of the processor data word via a multiplexer 54. The writing in the registers 50, 52 is executed under the control of a write control signal, via the lead 29a included in the control bus 29.

Initially, the 8-bit data word contained in the register 50 is thus applied, via the data bus 11, to the memory 10 so as to be written at the address determined by the one binary value on the lead 35. Subsequently, the binary value on the lead 35 is changed and, via the lead 31a, the data word stored in the register 52 is written into the register 50 via the multiplexer 54, said word being applied, via the data bus 11, to the memory 10 in which it is written. However, the two registers 50 and 52 can instead be connected in parallel to the input 30, in which case the multiplexer 54 selectively connects one of the outputs of the registers 50 or 52 to the data bus 11.

The control circuit 12 of FIG. 1 comprises among other things a known priority control circuit which grants priority to the request from the processor connected to the control bus 29 over a request from the processor connected to the control bus 25, and also comprises a number of selection circuits which similarly select control leads from the control bus 29 or 25 for connection, to the memory 10 via the bus 13. The control circuit 12 also comprises a sequencer which generates, for example the control signals for writing data read from the memory 10 into the associated data register a predetermined period of time after the selection and transfer of the relevant address. This time delay and the further operation for generating the control signals is controlled by the clock signals from a clock generator which has been omitted in FIG. 1 for the sake of simplicity. This clock generator can also control both processors or at least one of the processors, but the two processors may alternatively comprise their own clock generator, in which case the frequencies of the clock signals generated thereby may be quite different. The generating of the clock signals, however, may commence only in response to the next clock pulse edge after a request signal. As a result, waiting periods of up to the duration of one clock cycle may occur, depending on when the request signal occurs within the relevant clock cycle.

Figure 3:
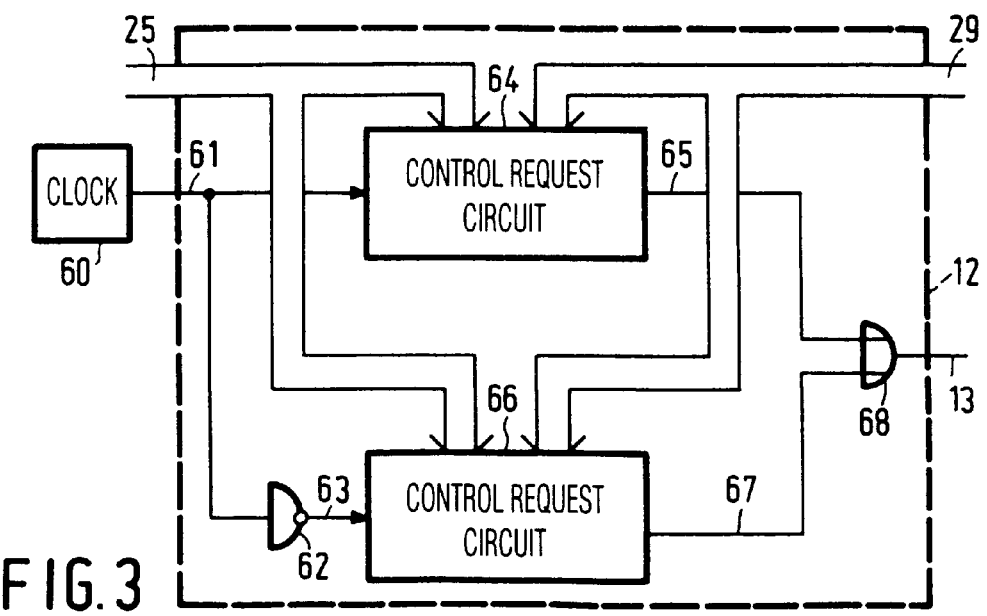
FIG. 3 shows the construction of the control circuit consisting of two essentially identical parts.

FIG. 3 diagrammatically shows the construction of a control circuit 12 for reducing this waiting period. This control circuit 12 comprises two control request circuits 64 and 66 which are represented by blocks for the sake of simplicity, because the internal construction results from the control leads arriving via the control buses 25, 29 and from the control signals required for the respective memory used. The circuits in the two parts 64 and 66 are controlled by means of clock signals which are generated by a clock generator 60 and which are applied directly to the control request circuit 64 via the lead 61 and in inverted form to the control request circuit 66 via the inverter 62 and the lead 63. As a result, the part in which an active clock pulse edge occurs first after the request signal responds to a request signal on the control bus 25, 29. The output signals generated on the outputs 65 and 67 of the parts 64 and 66, respectively, are combined, symbolized by the OR- circuit 68, and the relevant active signal or the active signal edge for controlling the memory is output via the output or the control bus 13 for the memory.

An access operation by the two processors connected to the circuit arrangement shown in FIG. 1 will be described in detail hereinafter on the basis of the time diagram which is shown by way of example in FIG. 4. The first line shows the clock signal of the clock generator 60 given in FIG. 3, the individual clock pulses being numbered from 1 to 12, it being assumed that processors are connected in which at least 12 clock pulses occur between two successive requests for access, even when the processors comprise independent clock generators.

Figure 4:
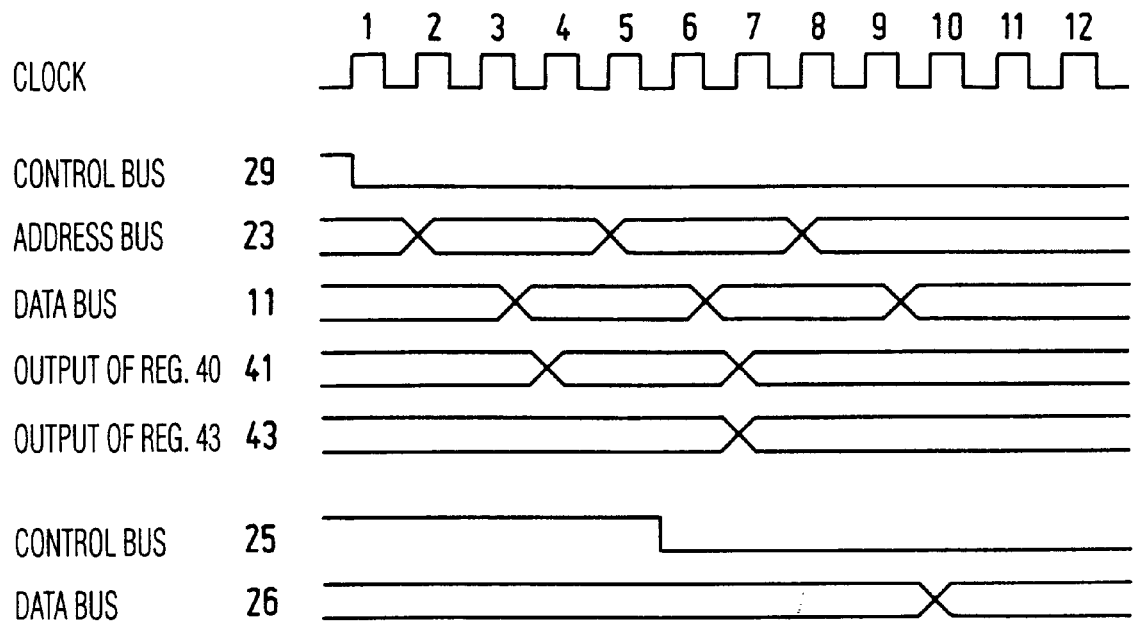
FIGS. 4 and 5 show two time diagrams.

The individual time diagrams of FIG. 4 are denoted by numbers which refer to the leads or buses in the circuits of the FIGS. 1 to 3 on which the signals of the time diagram occur.

Prior to the first pulse, a request signal occurs on the control bus 29 of the privileged processor. The processing and selection of the address signal thus initiated is assumed to require one clock pulse cycle, so that at the beginning of the second clock pulse the correct address is present on the address bus 23 of the memory 10. After 1½ clock pulse cycles, the data word read from the memory 10 appears on the data bus 11, which data word is written into the register 40 at the beginning of the fourth clock pulse so that it appears on the connection 41. At the beginning of the fifth clock pulse, the next address is applied, due to the switching over of the signal on the lead 35 in FIG. 1, to the memory 10 via the address bus 23, and 1½ clock pulse cycles later the next memory word appears on the data bus 11, which memory word is written into the register 40 at the beginning of the seventh clock pulse so that it appears on the connection 43, the previous contents being meanwhile transferred to the register 42. The bus drivers 44 and 46 of FIG. 2 can thus be enabled so that the complete data word on the data bus 30 becomes available to the processor.

Meanwhile, however, a request from the other processor has already reached the control bus 25 which, however, is retained in a waiting condition because of the current access by the privileged processor. The associated address is transferred to the address register 14 and, as soon as the previous access has been terminated, i.e. as soon as the second memory word has been transferred to the register and hence the waiting state has terminated, the new address is applied to the memory 10 at the beginning of the eighth clock pulse, so that the new data word appears on the data bus 11 again after 1½ clock pulse cycles and is written into the data register 17 at the beginning of the tenth clock pulse so as to appear on the data bus 26 for this processor. The transfer of the data word present on the data bus 30 need not have been terminated in the mean time. Similarly, the data word on the data bus 26 is still present while the next access by the privileged processor may already take place.

Figure 5:
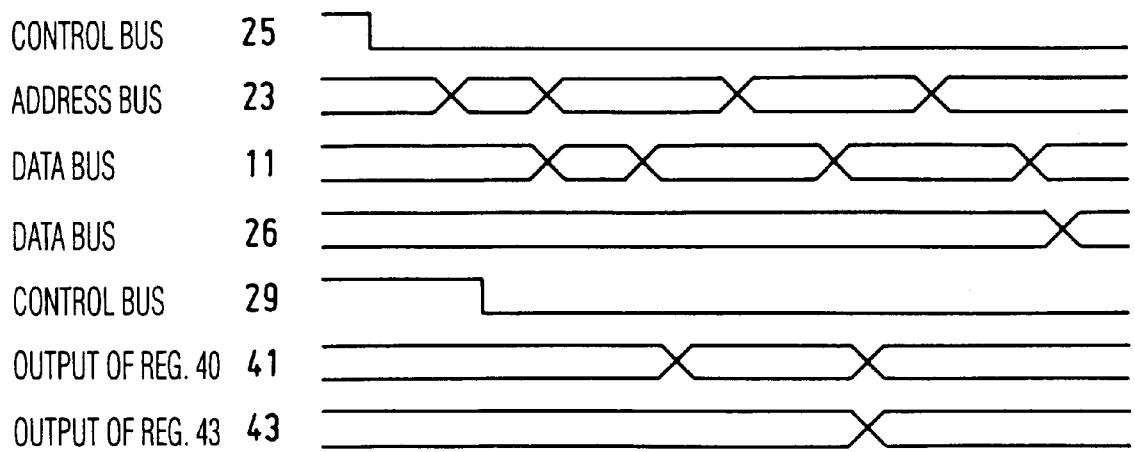

For the time diagram of FIG. 5 a request from the privileged processor is assumed to occur while the access by the non-privileged processor has already started by way of the corresponding signal on the control bus 25. This event is assumed to occur briefly before the trailing edge of the first clock pulse, so that the address on the address bus 23 for the memory 10 is applied by way of the trailing edge of the second clock pulse, so that the part 66 of the control circuit 12 in FIG. 3 is activated.

At the beginning of the third clock pulse, a request from the privileged processor appears on the control bus 29. The associated address appears on the address bus 23 at the beginning of the fourth clock pulse. Approximately at the same time the data word read during the interrupted access operation also appears on the data bus 11, but this word is no longer reliable or stable because of the approximately simultaneously occurring change of address, so that it cannot be transferred to the data register 17. Because of the change of address at the beginning of the fourth clock pulse, however, the first part of the data word for the privileged processor appears at the end of the fifth clock pulse, which word is transferred to the register 40 at the beginning of the sixth clock pulse so that it appears on the connection 41. The second part of the data word is then addressed and transferred to the register 40 in the same way as shown in FIG. 4, the first part being erased in the memory 42. This takes place at the beginning of the ninth clock pulse.

The access by the privileged processor has thus in principle been terminated and at the earliest instant thereafter, i.e. at the beginning of the tenth clock pulse, the address of the non-privileged processor whose access had not yet been completed is applied to the address bus 23 for the memory 10 and the word read is written into the data register 17 at the beginning of the twelfth clock pulse so as to appear on the data bus 26. However, because a long period of time has elapsed between the beginning of the request on the control bus 29 and the output of the associated data word, the associated processor must be set, if necessary, by a corresponding signal from the control circuit 12, to a waiting state until the access by the privileged processor has ended. This is of significance notably when the clock frequencies of the processors differ greatly and notably when the clock frequency of the non-privileged processor is substantially higher.

The described operations are executed in a similar way for the writing of a data word, so that these operations are not separately shown. Each write access, however, preferably commences by way of a read operation at the address to be written, which operation is then switched over to a write operation. During the writing of a data word, however, any waiting period for the non-privileged processor is cancelled if this write operation is interrupted by an access by the privileged processor, because the data to be written is already present in the data register of the non-privileged processor. The write operation is automatically continued by the control circuit 12 after termination of the interrupting access by the privileged processor, in the same way as in the case of reading.

It is to be noted that the numbers of clock cycles for the described operations have been chosen merely by way of example and that these numbers may also be different, depending on the exact construction of the control circuit and the memory.

Figure 6:
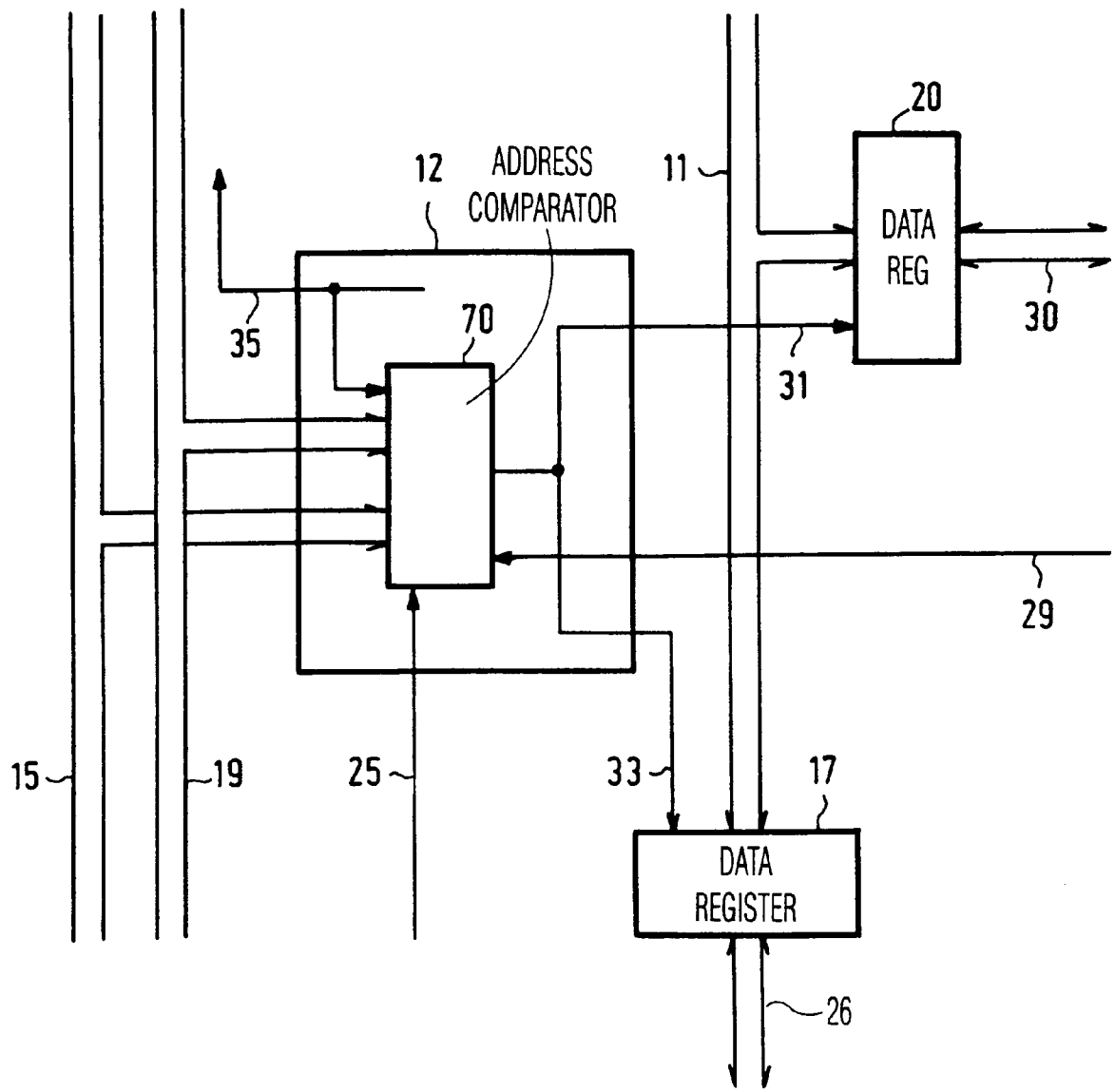
FIG. 6 shows an address comparator in the control circuit.

When a write process of a non-privileged processor is interrupted by a read access of the privileged processor and the same address is to be read in which the non-privileged processor would record, it should be ensured that the privileged processor indeed receives the word which is to be recorded and which has not been recorded in the memory yet. This is done by means of an extension of the control circuit 12 which is shown in FIG. 6. In this Figure, only those parts of FIG. 1, which are of importance within this context, are shown again and referred to by the same reference numerals.

In the control circuit 12 an address comparator 70 is present which receives the two addresses present on the buses 15 and 19. Additionally the comparator 70 also receives the signal on the lead 35 which represents a part of the address of the privileged processor. When the address comparator 70 establishes correspondence of the address on the bus 15 with the address on the bus 19 including the lead 35, and simultaneously a write access is presented by the non-privileged processor via the control lead 25 and a read access is present by the privileged processor via the control lead 29, the data register 17 is controlled via the lead 33 in order to apply the data to be written by the non-privileged processor on the data bus 11, and the data register 20 of the privileged processor is controlled via the connection 31 in order to take over the data word now present on the data bus 11. Of course, the access of the memory to read is suppressed. So in this manner the data register 20 receives the current data word of the accessed address, although this data word has not yet been recorded in the memory, and passes it on to the privileged processor via the data bus 30.

We claim:

1. A control circuit for generating control signals for controlling execution of read and write accesses to a memory by at least two processors, one of said processors of which has more privileged access to the memory relative to another of said processors, in response to read and write access request signals issued from any of said processors, said control circuit comprising:

a separate data register means coupled to each of said processors for storing data associated with said each of said processors;

write access control means for, in response to a write access request signal issued from one of said processors, writing data supplied by said one processor directly into the data register means coupled to said processor, said write access control means executing a write access to said memory to read data in said data register coupled to said one processor and to write the data read into said memory;

read access control means for, in response to a read access request signal from one of said processors, executing a read access to said memory to allow a reading of data from said memory, said read access control means for controlling writing the data read from said memory into the data register means coupled to said one processor, a predetermined period of time after said read access request signal, provided that, if said processor is not a privileged processor, no write access request signal has issued from a privileged processor during said predetermined period of time;

access interrupt means for, in response to an access request signal from the privileged processor during an execution of an access by another of said processors, interrupting the execution of the access by another non-privileged processor, executing the access requested by the privileged processor, and thereupon completing the interrupted execution of the access by said non-privileged processor; and address comparator means for, in response to a read access request signal issued by the privileged processor during a write access by a non-privileged processor, comparing a read address issued by the privileged processor with a write address issued by the non-privileged processor, and in the event said read and write addresses are the same, writing the data written in the data register means associated with the non-privileged processor into the data register means for the privileged processor.

* * * * *